April 12, 1955 — L. B. HEIN ET AL — 2,706,146
OXIDATION OF PHOSPHORUS WITH STEAM
Filed Sept. 16, 1950
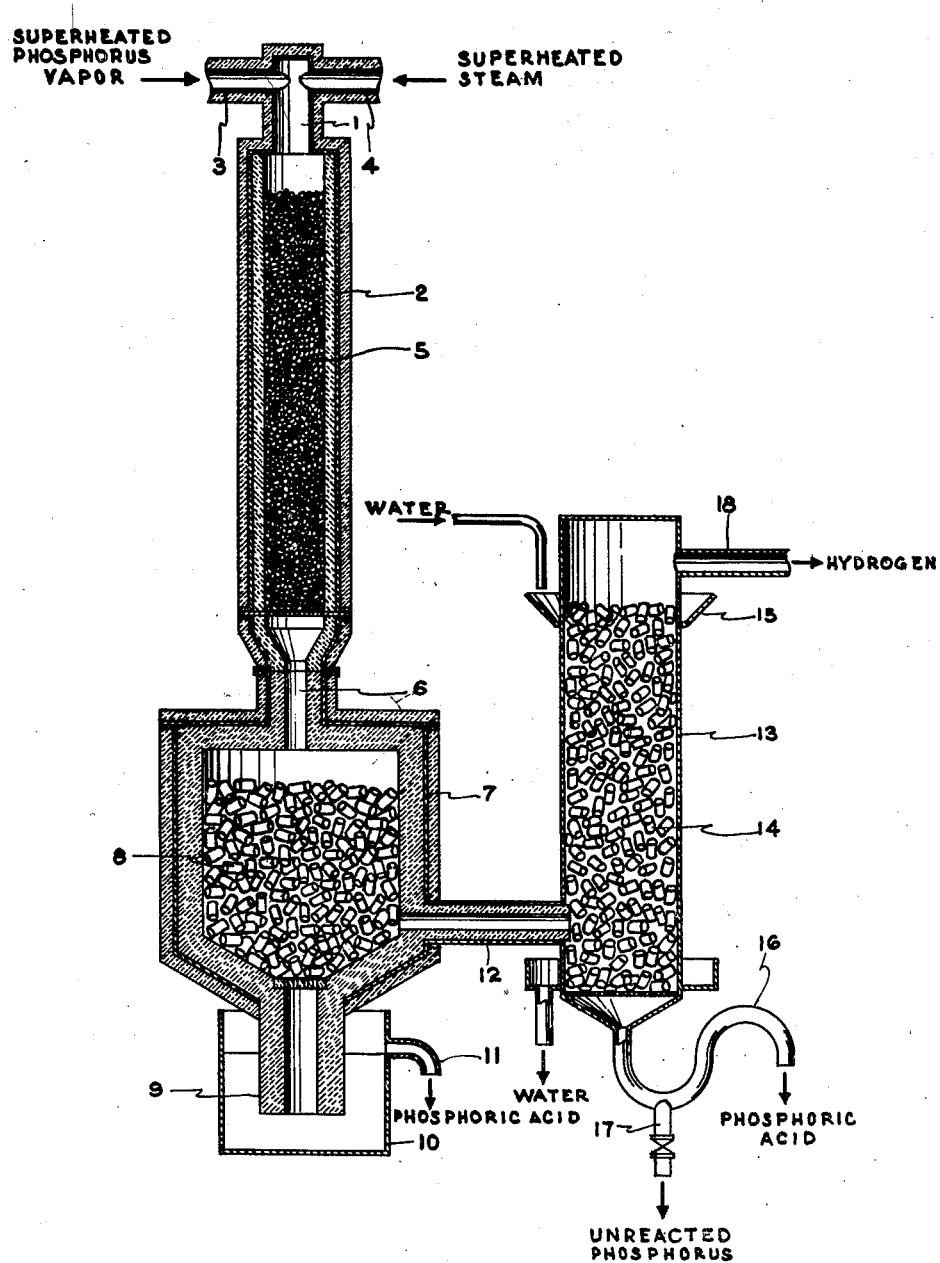
Lawrence B. Hein,
Donald W. Rindt,
John F. Shultz, and
Grady Tarbutton
INVENTORS.

United States Patent Office

2,706,146
Patented Apr. 12, 1955

2,706,146

OXIDATION OF PHOSPHORUS WITH STEAM

Lawrence B. Hein and Donald W. Rindt, Sheffield, Ala., John F. Shultz, Pittsburgh, Pa., and Grady Tarbutton, Sheffield, Ala., assignors to Tennessee Valley Authority, a corporation of the United States of America Application September 16, 1950, Serial No. 185,314

4 Claims. (Cl. 23—165)

(Granted under Title 35, U. S. Code (1952), sec. 266)

The invention herein described may be manufactured and used by or for the Government for governmental purposes without the payment to us of any royalty therefor.

This invention relates to improvements in the process wherein phosphorus is oxidized with steam to yield phosphoric acid and hydrogen. It relates particularly to a method for treating a gaseous mixture of products resulting from the reaction of phosphorus with steam.

Oxidation of phosphorus with water, under various conditions of pressure and temperature and in the presence of various catalysts, has been studied by a number of investigators. The processes which have been used fall into two general classes. In one the reaction is carried out in the liquid phase under pressure and at relatively low temperatures, as is typified by W. N. Ipatiew in U. S. Patent 1,848,295. In the other the phosphorus is reacted with steam in the vapor phase at atmospheric pressure and at high temperatures, as specified by F. G. Liljenroth and M. Larsson in U. S. Patent 1,605,960.

The Ipatiew process (liquid phase) has the advantage that a relatively low temperature is used and that the hydrogen is generated under pressure. There are handicaps in the process, however, which tend to nullify the advantages and make the process unsuitable for practical use. The reactants must be pumped in the form of an emulsion into the apparatus against high pressure, an operation which involves many operational difficulties. The proportion of water required to give a stable emulsion results in production of weak phosphoric acid (50 per cent $H_3PO_4$ or less) which is too dilute for many purposes. Moreover, operation in the liquid phase results in severe corrosion of equipment and in conversion of part of the reactant white phosphorus to the solid red form which causes plugging of pumps and nozzles.

Operation of the liquid-phase process apparently has never been attempted on a commercial scale. The many difficulties inherent in the process have cause attention to be turned to the vapor-phase (Liljenroth) method. This is a continuous, high-temperature process, usually carried out at about 1800° F. without catalyst or at temperatures of about 1300° F. in the presence of catalyst.

The vapor-phase process has been tried out on a commercial or semicommercial scale both in this country and in Europe. Apparently these attempts were unsuccessful since no commercial plant is in operation at present so far as is known. The results of work reported by Britzke and Pestov [Trans. Sci. Inst. Fertilizers (Moscow) 59, 5–160 (1929)] indicate that the trouble has been both incompleteness of oxidation of elemental phosphorus and contamination of the desired products by side-products of the phosphorus-steam reaction. The principal contaminants are phosphine in the hydrogen and phosphorous acid in the phosphoric acid. Production of phosphine and phosphorous acid as side-products reduces the amount of hydrogen and phosphoric acid that could otherwise be produced. The presence of phosphine in hydrogen renders it unsuitable for most of the uses to which hydrogen is put. The presence of more than a very small amount of phosphorous acid in phosphoric acid makes the acid unsuitable for use in the manufacture of products used in human or animal foods. Fertilizers made from acid containing phosphorous acid would contain phosphites which are not available to plants and which, if present in large amounts, are toxic to plants.

Catalysts for the oxidation of phosphorus with steam which promote substantially complete oxidation of the phosphorus, and which have a long life, are described and claimed in U. S. Patent 2,613,135 and U. S. Patent 1,613,134. However, even these efficient catalysts are incapable of yielding phosphoric acid low in phosphorous acid content and hydrogen low in phosphine content without subsequent treatment of the reaction products discharged from the catalyst bed.

One of the objects of this invention is to provide a method for the treatment of the products obtained by oxidizing phosphorus with steam whereby phosphoric acid and hydrogen of high purity may be obtained simply and at low cost.

Another object is to provide a method whereby phosphoric acid of high concentration may be obtained.

Other objects and features of novelty will be either specifically pointed out or will become apparent upon reference to the following description, claims, and drawing which shows an illustrative embodiment of this invention.

We have found that these objects can be met by oxidizing phosphorus with steam in a primary reaction zone; withdrawing a vaporous mixture of reaction products, in which substantially all phosphorus is present in pentavalent and trivalent states, from the primary reaction zone; introducing said mixture into a secondary reaction zone having a large surface area exposed to the mixture; maintaining a temperature in the range from 500° F. to the dew point of said mixture in a major portion of the secondary reaction zone; condensing a liquid composed essentially of phosphoric acid on said surface of the secondary reaction zone; flowing such condensed liquid downward over said surface in a film exposed to the gaseous remainder of said mixture until liquid-gas equilibrium is substantially established; withdrawing strong phosphoric acid from said secondary reaction zone; withdrawing a gaseous effluent from said secondary reaction zone; partially condensing said effluent and separating the same into a liquid phosphoric acid fraction and a gaseous hydrogen fraction.

The single figure attached is a diagrammatic vertical sectional view of one form of apparatus suitable for carrying out a process embodying our invention.

In the single figure, superheated steam and superheated phosphorus vapor are admitted to mixing chamber 1 of catalytic converter 2 via insulated pipes 3 and 4 respectively. The catalytic converter 2 is filled with a suitable catalyst 5 for promoting the reaction between phosphorus and steam. In the presence of a suitable catalyst, initial reaction between the phosphorus and steam takes place. Substantially all the phosphorus is oxidized to trivalent and pentavalent states in the converter, but not all the phosphorus is oxidized to $P_2O_5$. The exact form in which the various oxides and acids of phosphorus exist is uncertain. The products of this reaction pass via conduit 6 into secondary reactor 7, which is filled with packing 8. A temperature below the dew point of the gaseous reaction mixture (usually about 1200° to 1250° F.) and above 500° F., or preferably above 900° F. is maintained in the secondary reactor.

In the secondary reactor 7, phosphoric acid is condensed and phosphorous acid is converted to phosphoric acid. Concentrated phosphoric acid condensed therein trickles downward in a film on the surface of the reactor and packing therein until substantial liquid-gas equilibrium is reached, and a resulting highly concentrated phosphoric acid is withdrawn from the secondary reactor 7 through acid leg 9 into container 10, from which it is removed by overflow pipe 11.

Uncondensed or uncollected gases and vapors, which contain hydrogen, water vapor, entrained phosphoric acid, and a small amount of phosphine leave the secondary rector 7 via conduit 12 and pass into cooler 13. The cooler 13 is filled with packing 14 and is cooled externally by means of a water film distributed over its surface by spray ring 15. Upon cooling of the gas-vapor mixture, water is condensed and mixes with the phosphoric acid to form phosphoric acid more dilute than that collected in the secondary reactor. The dilute acid is withdrawn from the cooler via trap 16. Any unreacted phosphorus that might be present in the vapors is condensed in cooler 13 and, being more dense than phosphoric acid, collects at the low point in trap 16, from which point it may be withdrawn periodically through valved line 17.

Hydrogen, containing a small amount of phosphine, is withdrawn from the cooler via line 18 for subsequent treatment to remove phosphine, if desired.

Because of the high temperatures obtaining at many points in the system, and the corrosive nature of the intermediate and final reaction products, suitable materials of construction must be used in the equipment for carrying out the process. For the metal shells of the apparatus we have found that A. I. S. I. type 316 stainless steel gives good service. We have also found that a lining for the catalytic converter 2 may be prepared by mixing 6.2 parts by weight of a mixture containing 85 per cent of alumina and 15 per cent of clay with 1 part of 78-per cent phosphoric acid, tamping the mixture into place, slowly heating it to 1800° F. and maintaining the temperature at about 1800° F. for 1 hour. Such a lining is resistant to attack by process materials, is strong and resists cracking, and is easy to install.

As a liner for the conduit 6 and secondary reactor 7, we prefer to use carbon or graphite because of its resistance to attack by phosphoric acid. Carbon or graphite blocks may be joined with a mixture prepared from a silicate-base acidproof cement and coke breeze. Raschig rings of carbon have been found to be suitable packing for the secondary reactor 7 and the cooler 13. The total surface area of the secondary reactor and its packing should not be less than about 9 square feet, and preferably not less than about 20 square feet per pound of phosphorus introduced per hour.

Any suitable insulating material, such as asbestos or glass wool, may be used to insulate the catalytic converter 6 and the secondary reactor 7.

Tabulated below in Table I are the results of a series of pilot-plant runs made under various conditions in which results obtained by our invention in runs 3, 4, and 5 are contrasted with results from other methods. These runs were made in a pilot plant of substantially the same design as shown in the attached drawing. The catalytic converter (primary reaction zone) contained a vertical bed of catalyst 6 inches in diameter and 59 inches deep. The catalyst consisted of copper supported on zirconium pyrophosphate. Phosphorus vapor was fed to the catalytic converter at a temperature of 1300° F. and at a rate of 10 pounds of phosphorus per hour. Superheated steam at a temperature of 1300° F. was added at such a rate that the mixture of steam and phosphorus contained about 18 moles of $H_2O$ per mole of $P_4$. At this rate the space velocity within the catalytic converter was about 540 cubic feet (S. T. P.) of steam plus phosphorus vapor per cubic foot of catalyst per hour. Reaction products left the catalytic converter at an average temperature of about 1350° F., and entered the secondary reactor.

In the run tabulated under column 1 of Table I, the secondary reactor consisted of a closed vessel 30 inches in diameter and 30 inches high. The vessel was constructed of unlined stainless steel, and was fitted with water spray nozzles at the top, and was cooled with water sprays on the outside. When the products from the catalytic converter were rapidly cooled by spraying them with water in the secondary reactor, the acid withdrawn from the secondary reactor was dilute, and contained a high proportion of phosphorus acid. The hydrogen contained only a small amount of phosphine.

For the run tabulated under column 2 of Table I, a graphite-lined stainless steel secondary reactor was installed. This secondary reactor had an inside diameter of 21½ inches and was 22 inches high inside. No water was used in the runs tabulated under columns 2, 3, 4, and 5 to quench the reaction products from the catalytic converter. The temperature of the gases leaving the secondary reactor was higher than when the gases were quenched in the unlined secondary reactor (column 1). The proportion of the combined phosphorus present in trivalent form in the acid was lower than in run 1. The concentration of the acid was considerably higher than in run 1, and about one-half of the acid (expressed in terms of $P_2O_5$ collected) recovered was collected in the secondary reactor. Phosphine content of the hydrogen was higher than in run 1.

For run 3, the same graphite-lined secondary reactor used in run 2 was packed with 4-inch carbon Raschig rings to within 4 inches of the top. The phosphorous acid content of the acid was reduced, but the phosphine content of the hydrogen was increased. The amount of acid recovered in the secondary reactor increased to about 85 per cent of the total. Acid concentration was slightly higher than in run 2.

In run 4, 1-inch carbon Raschig rings were used as packing. Both the phosphorous acid content of the acid and the phosphine content of the hydrogen were lower than in run 3. Acid concentration was slightly higher, and the amount of acid recovered in the secondary reactor was markedly higher than in run 3.

In run 5, the graphite-lined secondary reactor packed with 1-inch carbon Raschig rings was covered with insulation over its outer surface. This resulted in higher temperatures both at the inlet and at the outlet of the secondary reactor. Phosphorous acid content of the acid and phosphine content of the hydrogen were reduced to very low values. The concentration of the acid was increased to 114.5 per cent $H_3PO_4$. The secondary reactor was not operated at equilibrium conditions long enough in this run for data on acid recovery to be accurate, but it is reasonable to assume that acid recovery under the conditions of run 5 would be at least equal to the recovery obtained in run 4.

Table II shows the relationships of surface area and volume in the secondary reactor for each of these runs.

*Table I*

|  | Water sprayed into unlined secondary reactor | Secondary reactor lined with graphite, no packing | Secondary reactor lined with graphite, packed with 4" carbon Raschig rings | Secondary reactor lined with graphite, packed with 1" carbon Raschig rings | Secondary reactor lined with graphite, packed with 1" carbon Raschig rings, shell insulated |
|---|---|---|---|---|---|
| Run number | (1) | (2) | (3) | (4) | (5) |
| Temperature at inlet to secondary reactor, °F |  | 712 | 830 | 920 | 1,150 |
| Temperature at gas outlet from secondary reactor, °F | 212 | 555 | 569 | 530 | 930 |
| $H_3PO_4$ content of secondary reactor acid, percent by weight | 33.1 | 93.5 | 102.6 | 106.0 | 114.5 |
| $H_3PO_3$ content of secondary reactor acid, percent by weight | 6.71 | 8.4 | 3.2 | 1.26 | 0.48 |
| Proportion of combined phosphorus in secondary reactor acid present in trivalent form, percent | 19.5 | 9.7 | 3.6 | 1.4 | 0.5 |
| $PH_3$ in hydrogen, vol. percent of $H_2 + PH_3$ | 0.33 | 1.16 | 1.77 | 1.1 | 0.2 |
| Proportion of acid recovered in secondary reactor to total acid produced, $P_2O_5$ basis, percent |  | 51.5 | 84.5 | 97.5 | (¹) |

¹ Secondary reactor was not at equilibrium conditions long enough for data on acid recovery to be accurate.

Table II

| Run No. | Volume of empty chamber, cu. ft. | Free volume of packed chamber, cu. ft. | Area of inside of empty chamber, sq. ft. | Area of inside of chamber plus area of packing, sq. ft. | Total surface area in sq. ft. per lb. of phosphorus introduced per hr. (at rate of 10 lb. P₄ per hr.) |
|---|---|---|---|---|---|
| 1 | 13.1 | | 29.8 | | 2.98 |
| 2 | 4.91 | | 15.63 | | 1.56 |
| 3 | 4.91 | 3.44 | 15.63 | 97.1 | 9.71 |
| 4 and 5 | 4.91 | 3.70 | 15.63 | 275.6 | 27.56 |

Whether or not the oxidation of phosphorus with steam is carried out in the presence of a catalyst is not material to this invention. Any conditions which result in substantially complete oxidation of the elemental phosphorus to trivalent and pentavalent states are satisfactory. It is preferable, however, to employ a catalyst, since the catalyzed reaction can be carried out at lower temperatures (of the order of 1300° F.) than the uncatalyzed reaction (1800° F. or more).

We have noted that the gases leaving the primary reaction zone contain both $P_2O_3$ and $P_2O_5$. It appears that an equilibrium between $P_2O_3$ and $P_2O_5$ exists in the primary reaction zone, and that the proportion of $P_2O_3$ increases with increased temperature of the primary reaction zone.

The purpose of the secondary reactor is to treat the reaction products from the primary reactor, which consist of $P_2O_5$, $P_2O_3$, hydrogen, and water vapor (plus any inert gases that may be present) in such a way that the trivalent phosphorus will be converted to the pentavalent form without forming excessive amounts of phosphine.

We are not certain as to the manner in which phosphine is formed, but we know that phosphine cannot be formed or exist at the temperatures maintained in the primary reaction zone. It is probable, therefore, that phosphine is formed by a reaction such as the following:

(a) $\quad 2P_2O_3 + 6H_2O \rightarrow 3H_3PO_4 + PH_3$

It is possible that this reaction takes place with formation of phosphorous acid as an intermediate step, (b) $\quad 2P_2O_3 + 6H_2O \rightarrow 4H_3PO_3$ and that the phosphorous acid decomposes to form phosphoric acid and phosphine:

(c) $\quad 4H_3PO_3 \rightarrow 3H_3PO_4 + PH_3$

In the conversion of trivalent phosphorus to pentavalent phosphorus without formation of phosphine, it is likely that the following reaction takes place:

(d) $\quad P_2O_3 + 5H_2O \rightarrow 2H_3PO_4 + 2H_2$

This reaction could also take place with the intermediate formation of phosphorous acid:

(e) $\quad P_2O_3 + 3H_2O \rightarrow 2H_3PO_3$ and (f) $\quad 2H_3PO_3 + 2H_2O \rightarrow 2H_3PO_4 + 2H_2$ We conclude that in run 5, wherein the packed secondary reaction zone was maintained at temperatures between 1150° F. at the inlet and 930° F. at the gas outlet, the conditions were favorable for reaction (d), or the combination of reactions (e) and (f), to go nearly to completion while, simultaneously, reaction (a) or the combination of reactions (b) and (c) was suppressed.

Our studies have shown that the secondary reaction zone should have a large surface area as compared to its free volume. We prefer to use a chamber filled with packing to obtain a high ratio of surface area to free volume, although other forms of apparatus may also be employed. For example, the reaction products from the primary reaction zone might be passed through a bank of tubes in parallel flow, or they might be passed through a series of "S-bend" tubes.

The packing used in the secondary reactor probably serves several functions. It reduces entrainment of fine droplets of acid in the hydrogen. In addition, if the conversion of trivalent to pentavalent phosphorus within the secondary reactor actually takes place in accordance with reactions (e) and (f) (that is, with intermediate formation of liquid $H_3PO_3$ which reacts with $H_2O$ to yield $H_3PO_4$ and $H_2$), the packing also serves to retard the flow of liquids through the reactor and provides a large surface over which the liquid acid is distributed.

The high degree of recovery of acid in the secondary reactor, and the high concentration of this acid, are unexpected results of our method of operation.

We claim as our invention:

1. A process for the production of phosphoric acid and hydrogen which comprises oxidizing phosphorus with steam in a primary reaction zone; withdrawing a vaporous mixture of reaction products, in which substantially all phosphorus is present in pentavalent and trivalent states, from the primary reaction zone; introducing said mixture alone into a secondary reaction zone having a total surface area of not less than about 9 square feet per pound of phosphorus introduced per hour; maintaining a temperature in the range from 500° F. to the dew point of said mixture in a major portion of the secondary reaction zone; condensing a liquid composed essentially of phosphoric acid on said surface of the secondary reaction zone; flowing such condensed liquid downward over said surface in a film exposed to the gaseous remainder of said mixture until liquid-gas equilibrium is substantially established; withdrawing strong phosphoric acid low in phosphorous acid content from said secondary reaction zone; withdrawing a gaseous effluent from said secondary reaction zone; and partially condensing said effluent and separating the same into a liquid phosphoric acid fraction and a gaseous hydrogen fraction low in phosphine content.

2. A process for the production of phosphoric acid and hydrogen which comprises oxidizing phosphorus with steam in a primary reaction zone; withdrawing a vaporous mixture of reaction products, in which substantially all phosphorus is present in pentavalent and trivalent states, from the primary reaction zone; introducing said mixture alone into a secondary reaction zone having a total surface area of not less than about 20 square feet per pound of phosphorus introduced per hour; maintaining a temperature in the range from 500° F. to the dew point of said mixture in a major portion of the secondary reaction zone; condensing a liquid composed essentially of phosphoric acid on said surface of the secondary reaction zone; flowing such condensed liquid downward over said surface in a film exposed to the gaseous remainder of said mixture until liquid-gas equilibrium is substantially established; withdrawing strong phosphoric acid low in phosphorous acid content from said secondary reaction zone; withdrawing a gaseous effluent from said secondary reaction zone; and partially condensing said effluent and separating the same into a liquid phosphoric acid fraction and a gaseous hydrogen fraction low in phosphine content.

3. A process for the production of phosphoric acid and hydrogen which comprises oxidizing phosphorous with steam in a primary reaction zone; withdrawing a vaporous mixture of reaction products, in which substantially all phosphorus is present in pentavalent and trivalent states, from the primary reaction zone; introducing said mixture alone into a secondary reaction zone having a total surface area of not less than about 9 square feet per pound of phosphorus introduced per hour; maintaining a temperature in the range from 900° F. to the dew point of said mixture in a major portion of the secondary reaction zone; condensing a liquid composed essentially of phosphoric acid on said surface of the secondary reaction zone; flowing such condensed liquid downward over said surface in a film exposed to the gaseous remainder of said mixture until liquid-gas equilibrium is substantially established; withdrawing strong phosphoric acid low in phosphorous acid content from said secondary reaction zone; withdrawing a gaseous effluent from said secondary reaction zone; and partially condensing said effluent and separating the same into a liquid phosphoric acid fraction and a gaseous hydrogen fraction low in phosphine content.

4. A process for the production of phosphoric acid and hydrogen which comprises oxidizing phosphorus with steam in a primary reaction zone; withdrawing a vaporous mixture of reaction products, in which substantially all phosphorus is present in pentavalent and trivalent states, from the primary reaction zone; introducing said mixture alone into a secondary reaction zone having a total surface area of not less than about 20 square feet per pound of phosphorus introduced per hour; maintaining a temperature in the range from 900° F. to the dew point of said mixture in a major portion of the secondary reaction zone; condensing a liquid composed essentially of phosphoric acid on said surface of the secondary reaction zone; flowing such condensed liquid downward over said surface in a film exposed to the gaseous remainder of said mixture until liquid-gas equilibrium is substantially established; withdrawing strong phosphoric acid low in phosphorous acid content from said secondary reaction zone; withdrawing a gaseous effluent from said secondary reaction zone; and partially condensing said effluent and separating the same into a liquid phosphoric acid fraction and a gaseous hydrogen fraction low in phosphine content.

References Cited in the file of this patent

UNITED STATES PATENTS

| 1,605,960 | Liljenroth et al. | Nov. 9, 1926 |
| 1,823,923 | Wild et al. | Sept. 22, 1931 |
| 2,303,318 | Baskervill | Dec. 1, 1942 |

FOREIGN PATENTS

| 324,122 | Great Britain | Jan. 20, 1930 |
| 325,533 | Great Britain | Feb. 17, 1930 |